Sept. 11, 1951     J. B. POLOMSKI     2,567,446
AUTOMATIC TRANSMISSION
Filed Oct. 30, 1944     2 Sheets-Sheet 1

Inventor:
John B. Polomski

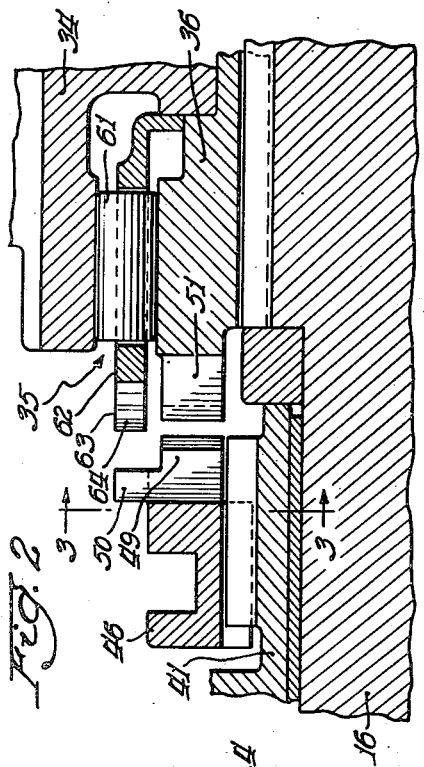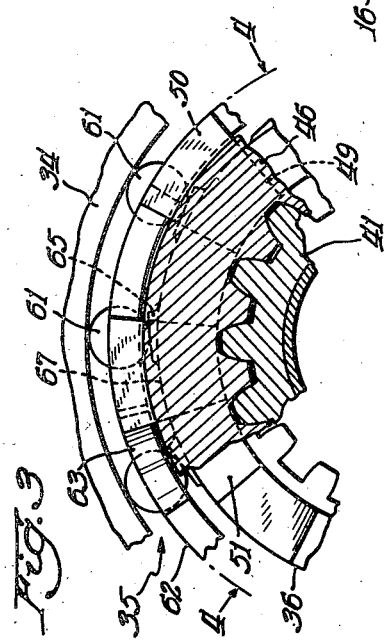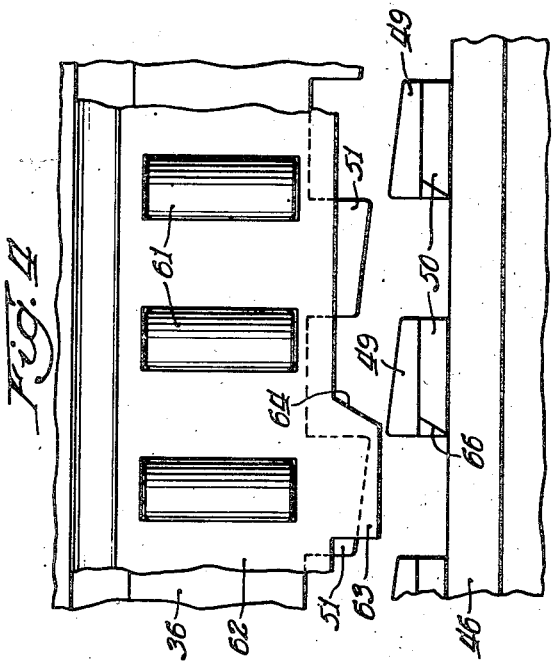

Patented Sept. 11, 1951

2,567,446

UNITED STATES PATENT OFFICE 2,567,446

AUTOMATIC TRANSMISSION

John B. Polomski, Detroit, Mich., assignor to Borg-Warner Corporation, Chicago, Ill., a corporation of Illinois Application October 30, 1944, Serial No. 561,044

22 Claims. (Cl. 74—368)

This invention relates generally to change speed mechanism employing one-way clutches for transmitting torque from a rotatable drive member to a rotatable driven member and more particularly relates to a locking device for controlling one of the one-way overrunning clutches in said mechanism.

Such change speed mechanism, with appropriate controls, is adapted for use in automotive vehicles to provide a semi-automatic power transmission unit which frees the driver from use of a foot pedal which controls the clutch and from use of the usual gear shift lever. Four speeds forward (low, second, third and direct) and a reverse speed are provided in a mechanism of this type and in normal operation the automobile may be started in second and, upon accelerating to a predetermined minimum speed, may be shifted to direct merely by a momentary release of the accelerator pedal. Thereafter, when the car slows down to a predetermined minimum speed, second speed may be automatically reengaged. Consequently, when the car comes to a standing position, it is normally in second and ready for forward motion when the driver again depresses the accelerator pedal. Provision is also made for starting in first or for going from second to first or from fourth (or direct) to third or from third to first speed where that is desired.

However, it has been found that under certain conditions such as those enumerated below, this change speed mechanism jams or locks up resulting in its inability to perform and resulting in some cases in breakage of the parts. The jamming just referred to occurs in one of the one-way clutches of the change speed mechanism which winds up and becomes jammed when, for example, the automobile is in second speed and subsequently rolls or is pushed backwardly. Such jamming also tends to bind positive type, two-way clutches in the system so that they too cannot be disengaged at will. Rolling backwardly might occur, for example, when the automobile is on an incline. Pushing in a backward direction might result from the act of another automobile either in its rolling backwardly inadvertently or in its being driven backwardly while on the road or in a parking space.

Similarly, jamming may also occur when the automobile is in second speed if it engages an immovable object with the front bumper in such a way that the bumper becomes flexed, because the bumper in trying to unflex tends to move the automobile backwardly.

It is the object of my invention to provide a locking device which will prevent the jamming of the one-way clutch which is subject to such disability and which will also prevent the resulting jamming of the positive type clutches in the change speed mechanism.

It is a further object of my invention that the provision of the aforementioned locking device shall leave unimpaired the normal functioning of the one-way clutches.

Other desirable objects inherent in this invention will become clear from the following description of the change speed mechanism, the locking device and their cooperating action, reference being made to the accompanying drawings in which like reference numerals designate like parts in the several views.

Fig. 2 is an enlarged fragmentary sectional view of the locking device, the associated one-way clutch and of the immediately related parts of the change speed mechanism;

Fig. 3 is a fragmentary view partially in section and partially in elevation taken along the line 3—3 of the Fig. 2; and Fig. 4 is a developed view of the one-way clutch taken substantially along the line 4—4 of Fig. 3.

Figure 1:
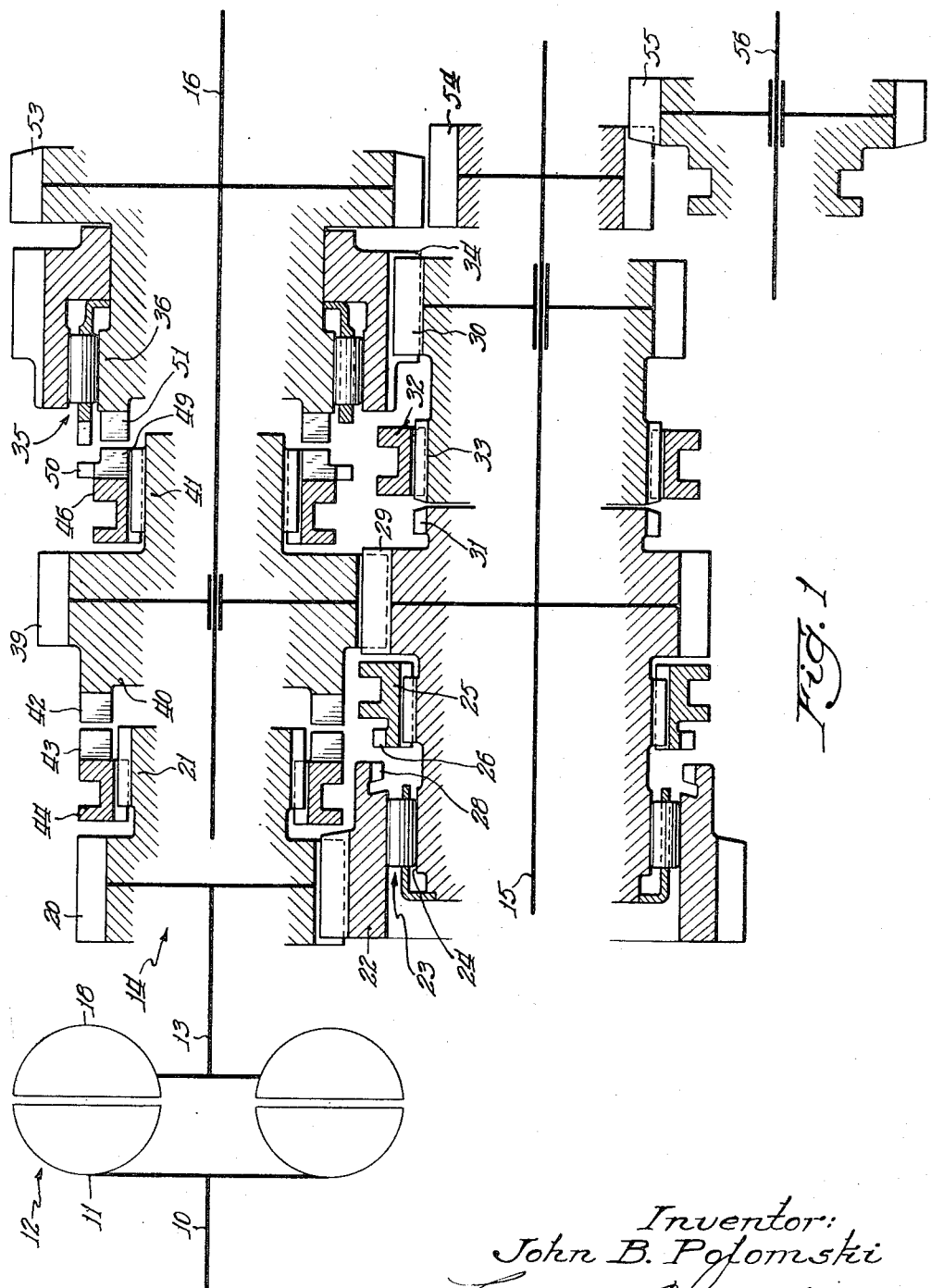
Fig. 1 is a diagrammatic showing of the change speed mechanism incorporating the locking device (idler shaft 56 is swung out from its proper plane for illustrative purposes only)

The transmission diagrammatically disclosed in Fig. 1 is of a type suitable for use in an automotive vehicle and includes a driving shaft 10, such as a motor crankshaft, which is connected to the impeller 11 of fluid coupling 12, an intermediate shaft 13 leading to and connected with the gearing which is designated generally at 14, a countershaft 15 and a driven shaft 16 leading from the gearing and connected in some suitable manner to the road wheels (not shown) of the vehicle. The fluid coupling 12 is of a known type in which the blades of the impeller 11 drive the fluid of the coupling, which fluid in turn transmits torque to the runner 18 by impinging upon its blades to rotate it in the same direction as the impeller.

Shaft 13, connected at one end to the runner 18 of the fluid coupling 12, has connected to its other end a gear 20 having a hub 21 both of which rotate with said shaft. The gear 20 engages with a larger gear 22 to drive it when the motor (not shown) transmits drive through the fluid coupling. Gear 22 in turn transmits drive through the one-way or overrunning clutch 23 to a hub 24 which is fixed to the countershaft 15. Splined to a portion of hub 24 is a slidable clutch element 25 which rotates with said hub and which may be shifted axially so that its teeth 26 engage inner teeth 28 formed on gear 22 to thereby lock out the one-way drive through overrunning clutch 23 and replace it by a positive two-way drive. Shaft 15 also carries gear 29 which is formed integrally with the hub 24 and a gear 30 of smaller diameter than gear 29, said gear 30 being freely rotatable on the shaft 15. Gear 29 has an integral hub portion carrying external clutch teeth 31 which are engageable by a clutch member 32 which is splined to a hub 33 of gear 30 for rotation therewith and which is shiftable axially on said hub to permit the clutch member to engage with teeth 31. When so engaged, rotative movement of shaft 15 is transmitted through the clutch 32 to hub 33 and thence to gear 30 to cause it to drive gear 34 with which it engages. Gear 34 is borne by means of the one-way or overrunning clutch 35 on a hub 36 which is splined to shaft 16 for rotation therewith.

A gear 39 which is borne by shaft 16 and rotates freely thereon has two hub portions 40 and 41. Hub portion 40 carries clutch teeth 42 which are engageable by clutch teeth 43 of a clutch member 44. Clutch member 44, by splined connection with hub 21, may be shifted axially with respect thereto to engage its teeth 43 with teeth 42 in order to transmit rotative movement of shaft 13 directly to gear 39 which rotates freely on shaft 16. Hub portion 41 of gear 39 carries a clutch member 46 rotatable therewith and shiftable axially with respect thereto by reason of the splined connection between said clutch member and the hub. The shiftable clutch member 46 carries clutch teeth 49 each of which has a radially extending flanged portion 50 which will be described in greater detail hereinafter. Hub 36 which is fixed to the driven shaft 16 carries clutch teeth 51 which are engaged by teeth 49 of the shiftable clutch member 46 when the latter member is shifted to the right, as viewed in Fig. 1.

Gears 53 and 54, which are fixed on and rotatable with shaft 16 and 15, respectively, form the reverse driving means when idler gear 55 is axially shifted on its shaft 56 into engagement with them. Shifting of idler gear 55, as well as shifting of shiftable clutch members 25, 32, 44 and 46 to engage or disengage their respective positive clutching means, may be accomplished by any appropriate means which are not shown. (So that the idler gear 55 and its shaft 56 may be more readily seen they have been swung out from their normal plane, as was noted above.)

The transmission which is diagrammatically represented in Fig. 1 provides four speeds forward and one reverse speed. Low or first speed forward is obtained when shiftable clutch member 32 is shifted into engagement with teeth 31 which are formed externally on a hub portion of gear 29. Drive then proceeds from the shaft 10 through the fluid coupling 12, the shaft 13, the gear 20, the gear 22, the one-way or overrunning clutch 23, the hub 24, the shaft 15, the body of gear 29 and its hub portion, the teeth 31 on said hub, the clutch 32, the gear 30, the gear 34, the one-way or overrunning clutch 35 and the hub 36 to the shaft 16. The one-way clutches 23 and 35 are so constructed that when the automotive vehicle is coasting forward in first speed, for example, the shaft 16 may free-wheel, i. e., may rotate faster than gear 34, and shaft 15 may rotate faster than gear 22.

Second speed forward is established by leaving clutch 32 in engagement with teeth 31 and shifting clutch member 46 so that its teeth 49 engage teeth 51 on hub 36. As will be more fully explained hereinafter, such shifting of clutch member 46 also acts upon the one-way clutch 35 to positively prevent it from effecting driving engagement when the transmission is in second speed and the vehicle accidentally moves backwardly in some manner. The power drive in second speed forward proceeds from shaft 10 through the fluid coupling 12, the gear 20, the gear 22, the one-way clutch 23, the hub 24, the gear 29, the gear 39, the teeth 49 of shiftable clutch member 46, the teeth 51 and the hub 36 to shaft 16.

Third speed forward may be obtained by first disengaging teeth 49 of shiftable clutch element 46 from teeth 51 and then shifting shiftable clutch member 44 to engage its teeth 43 with teeth 42 which are formed on hub 40 of gear 39. The power drive then proceeds from shaft 10 through the fluid coupling 12, the body of gear 20 and its hub 21, the teeth 43 of shiftable clutch member 44, the teeth 42, the hub 40 and gear 39, the gear 29 and its hub which carries the teeth 31, the shiftable clutch member 32, the gear 30, the gear 34, the one-way clutch 35, and the hub 36 to shaft 16. At this time gear 20 also drives gear 22 while gear 39 drives hub 24, through gear 29, at a different and higher speed. These differences in speed of rotation between gear 22 and hub 24 are made possible by the overrunning of the one-way clutch 23 which is interposed between said gear and said hub.

Fourth or direct forward speed may be obtained by leaving the teeth 43 of shiftable clutch member 44 engaged with teeth 42 and then engaging the teeth 49 and 51 by shifting shiftable clutch member 46 to the right, as viewed in Fig. 1. The power drive then proceeds from shaft 10 through the fluid coupling 12, the body of the gear 20 and its hub 21, the shiftable clutch member 44, the teeth 43 and 42, the hubs 40 and 41 of gear 39, the shiftable clutch member 46, the teeth 49 and 51, and the hub 36 to the shaft 16. In this speed shaft 15 is driven faster than gear 22 so the one-way clutch 23 overruns. Similarly, shaft 16 is driven faster than gear 34 thus causing the one-way clutch 35 to overrun.

Reverse drive is obtained by first having shiftable clutch members 32, 44 and 46 in disengaged position. (The teeth 26 of shiftable clutch member 25 normally will not be engaged with the internal teeth 28 of gear 22, but if they are so engaged the reverse drive will differ only in that it will be two-way reverse drive, by-passing the one-way clutch 23, instead of one-way reverse drive through said one-way clutch.) Next, the idler gear 55 is shifted along its shaft 56 into engagement with gear 53, on shaft 16, and gear 54, on shaft 15. The power drive in reverse will proceed from shaft 10 through the fluid coupling 12, the gear 20, the gear 22, the one-way clutch 23, the hub 24, the shaft 15, the gear 54, the idler gear 55 and the gear 53 to the shaft 16.

This transmission is normally adapted to be started in second speed and then, upon a predetermined minimum speed being attained, fourth or direct speed is engaged merely by the shifting of shiftable clutch member 44 to the right (as viewed in Fig. 1) to engage its teeth 43 with the teeth 42 of the positive clutching member. One-way clutch 23 will then overrun and so will one-way clutch 35 since shiftable clutch member 32 will normally be engaged during all forward speeds so that the operator may selectively go from second speed to first speed, from second to third, from fourth to third or from third to first speeds. Two-way drive through second speed may be obtained when desired (for example, when the automotive vehicle in which the transmission is disposed is proceeding down a steep incline) by engaging the teeth 26 of shiftable clutch member 25 with the internal teeth 28 of gear 22. In that way the roller clutch 23 is shunted and gear 22 drives shaft 15 through the teeth 28 and 26.

It has been found that in a transmission of this type that in second speed a dangerous situation may arise if the automotive vehicle rolls or is pushed in a backward direction or if the front bumper is flexed by engagement with a fixed object. What actually occurs in such case is a locking-up or jamming of one-way clutch 35 (which is shown in the preferred embodiment of my invention as being an overrunning roller clutch) by reason of a couple exerted on its rollers by the hub 36 and the inner surface of gear 34 which form the inner and outer members, respectively, of the one-way clutch. The action of this couple can be more readily understood by combined reference to Figs. 1 and 3, keeping in mind that the automotive vehicle is in second speed and inadvertently rolls or is pushed backwardly. Shaft 16 will rotate in a counterclockwise direction (Fig. 3) and will drive hub 36 with it by reason of the splined connection between the shaft and hub. Hub 36, which has formed on its circumference a series of cams 65, will rotate faster than gear 34 and the rollers 61 will, therefore, roll up on the cam surfaces 65 and wedge into engagement with the inner surface of gear 34. Shaft 16 will, therefore, attempt to drive gear 34 in a direction reverse to its normal direction of rotation and at the same speed as shaft 16 itself. Gear 34, however, is prevented from rotating as fast as shaft 16 by reason of its being driven at a slower speed by the same shaft (16) through speed reducing gears of the transmission. This driving connection which produces said slower speed of gear 34 proceeds from shaft 16 through hub 36, the teeth 51 and 49, the clutch element 46, the hub 41 and gear 39, the gear 29, the teeth 31 and clutch member 32 (which is normally engaged during all forward speeds), the hub 33 and gear 30 which drives gear 34. The couple thus exerted upon the rollers 61 in such a situation will result in deformation, if not breakage, of the parts of the one-way clutch 35. At the same time the shiftable clutch members 46 and 32 cannot be disengaged by reason of the torque exerted on the teeth of said clutches and, as a result, the automotive vehicle cannot be driven in a forward or backward direction.

To prevent such an occurrence when the transmission is placed in second speed, I have provided means which shifts the rollers 61 of one-way clutch 35 into a position where they cannot wedge between the cam surfaces 65 of hub 36 and the inner surface of gear 34, but which leaves the one-way clutch 35 unhampered for its normal power transmitting purposes in first and third speeds.

For a description of said means reference should be made to Figs. 2, 3 and 4 and particularly to the roller cage 62 of the one-way clutch 35 and to the flanges 50 on each of the teeth 49, which teeth are integrally formed as a part of shiftable clutch member 46. Assuming for the purposes of illustration that the automotive vehicle has been proceeding forwardly in first speed and second speed is desired by the operator, the accelerator pedal (not shown) will be released and shiftable clutch member 46 will be shifted to the right, as viewed in Fig. 2, by any suitable shifting means. At this time clutch member 46 and its teeth 49 will be rotating more rapidly than teeth 51 of the hub 36. Since the faces of said teeth 49 and 51 are beveled, as shown in the drawings, the teeth 49 will overrun the teeth 51 until the clutch member 46 slows down and starts to rotate more slowly than the hub 36 and its teeth 51. At that moment teeth 49 will slide into initial meshing engagement with teeth 51. As the teeth 49 are shifted axially toward full meshing engagement with teeth 51, the flanges 50 of the teeth 49 approach one or more axial projections 63, which are formed on the side of the roller cage 62, and subsequently engage said projections. The projections 63 are formed with cam surfaces 64 on one edge and the flanges 50 are formed with opposed cam surfaces 66 so that engagement between the projections 63 and flanges 50 will be a sliding engagement between their respective cam surfaces 64 and 66 which will cam the projections 63 and, consequently, roller cage 62 in a counterclockwise direction (see Figs. 3 and 4). Such movement of the roller cage will shift the rollers 61 downwardly along the cam surfaces 65 on hub 36 until they drop into pockets 67 where they will be positively maintained out of wedging contact with the inner surface of gear 34.

The projections 63 are preferably fewer in number than are the flanges 50 and they are so spaced around roller cage 62 that, when the rollers 61 are wedged into engagement between cam surfaces 65 of hub 36 and the inner surface of gear 34, the meshing of teeth 49 with teeth 51 will always result in the cam surfaces 66 on the flanges 50 meeting the cam surfaces 64 and camming them counterclockwise. As the teeth 49 and 51 become fully meshed, projections 63 will be cammed into the spaces between adjacent flanges 50, which spaces will preferably be filled thereby, and the rollers 61 and roller cage 62 will be held from further rotation about the hub 36. In this way not only will the rollers 61 be prevented from wedging between the cam surfaces 65 and gear 34 but also the roller cage 62 will be held firmly to prevent it from rattling. Consequently, even if the automotive vehicle should be moved backwardly when in second speed, the one-way clutch 35 will not lock-up or jam. However, as soon as shiftable clutch member 46 is shifted to the left, as viewed in Fig. 2, so that its teeth 49 are disengaged from teeth 51, the one-way clutch 35 will be released to assume its normal one-way driving functions in the transmission.

Although a preferred form of my invention has been described, it is to be understood that its scope is not intended to be limited thereto except only insofar as the invention is limited by the appended claims.

I claim:

1. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first named clutch is disengaged, said driven member being driven in the same direction during the completion of either of said drives, and means rendered effective, when said first named clutch is engaged, for preventing an engagement of said one-way clutch whereby to prevent a jamming lock up of both of said clutches when torque other than that derived from the driving member is applied to said driven member in the opposite direction.

2. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first named clutch is disengaged, said driven member being driven in the same direction during the completion of either of said drives, and means rendered effective, when said first named clutch is engaged, for preventing an engagement of said one-way clutch whereby to prevent a jamming lock up of both of said clutches when torque other than that derived from the driving member is applied to said driven member in the opposite direction, said last named means comprising interengageable elements carried by said first named clutch and said one-way clutch respectively.

3. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first named clutch is disengaged, said driven member being driven in the same direction during the completion of either of said drives, said one-way clutch comprising an inner member, an outer member, rollers adapted to wedge between said members to cause engagement of the one-way clutch and a cage for said rollers and movable therewith, and means rendered effective upon engagement of said first named clutch to shift the roller cage and rollers of said one-way clutch so that engagement of said one-way clutch is rendered impossible whereby to prevent a jamming lock up of both of said clutches when torque other than that derived from the driving member is applied to said driven member in the opposite direction.

4. In power transmission mechanism, the combination of a driving member, a driven member, means including a clutch for driving said driven member at a certain speed ratio, means including a one-way clutch for driving the driven member at a slower speed ratio when said first named clutch is disengaged, said one-way clutch comprising an inner member, an outer member, rollers adapted to wedge between said members to cause engagement of the one-way clutch and a cage for said rollers and movable therewith, said first named clutch comprising a shiftable clutch element having teeth and a complementary clutch element having teeth, which latter element is connected to the inner member of said one-way clutch, and means rendered effective upon engagement of said first named clutch to prevent engagement of said one-way clutch, said last named means comprising radial flanges on the teeth of the shiftable clutch element, a cam surface formed on each of said flanges, axial projections formed on the cage, and a cam surface formed on each of said projections and opposing the cam surfaces on said flanges, said two sets of cam surfaces, when brought into engagement subsequent to initial meshing engagement of the first named clutch, reacting against one another to shift the cage and rollers into a position between the members of the one-way clutch so that engagement of said one-way clutch is rendered impossible.

5. In power transmission mechanism, the combination of a driving member, a driven member, means including a clutch for driving said driven member at a certain speed ratio, means including a one-way clutch for driving the driven member at a slower speed ratio when said first named clutch is disengaged, said one-way clutch comprising an inner member, an outer member, rollers adapted to wedge between said members to cause engagement of the one-way clutch and a cage for said rollers and movable therewith, said first named clutch comprising a shiftable clutch element having teeth and a complementary clutch element having teeth, which latter element is connected to the inner member of said one-way clutch, and means rendered effective upon engagement of said first named clutch to prevent engagement of said one-way clutch, said last named means comprising radial flanges on the teeth of the movable clutch element, a cam surface formed on each of said flanges, axial projections formed on the cage and having a shape adapted to fill the space between adjacent flanges when engagement of said flanges and said projections is fully effected, and a cam surface formed on each of said projections and opposing the cam surfaces on said flanges, said two sets of cam surfaces, when brought into engagement subsequent to initial meshing engagement of the first named clutch, reacting against one another to shift the cage and rollers into a position between the members of the one-way clutch so that engagement of said one-way clutch is rendered impossible.

6. In power transmission mechanism, the combination of a power input member, a power output member, a clutch for directly connecting said members, a gear train for driving said output member from said input member in the forward direction and at a slower speed than the input member when said clutch is disengaged, a one-way clutch for completing said gear train, and means operable under the control of said first-mentioned clutch when the latter is engaged for preventing engagement of said one-way clutch when torque other than that derived from said input member is applied to said output member in the reverse direction.

7. In power transmission mechanism, the combination of a power input member, a power output member, a clutch for directly connecting said members, a gear train for driving said output member from said input member in the forward direction and at a slower speed than the input member when said clutch is disengaged, a one-way clutch for completing said gear train, said one-way clutch comprising an inner member, an outer member, rollers adapted to wedge between said members to cause engagement of the one-way clutch and a cage for said rollers and movable therewith from an operative position wherein the rollers are effective and the one-way clutch is engaged to an inoperative position wherein the rollers are ineffective and the one-way clutch is disengaged, and means carried by and operable under the control of said first-mentioned clutch for shifting the cage of said one-way clutch to its inoperative position to prevent engagement of the one-way clutch when said first-mentioned clutch is engaged and torque other than that derived from said input member is applied to said output member in the reverse direction.

8. In power transmission mechanism, the combination of a power input member, a power output member, a clutch for directly connecting said members, a gear train for driving said output member from said input member in the forward direction and at a slower speed than the input member when said clutch is disengaged, a one-way clutch for completing said gear train, said one-way clutch comprising an inner member, an outer member, rollers adapted to wedge between said members to cause engagement of the one-way clutch and a cage for said rollers and movable therewith, said first-named clutch comprising a shiftable clutch element having teeth and complementary teeth engageable with said first-named teeth and connected to the inner member of said one-way clutch, and control means for said one-way clutch comprising radial flanges on the teeth of the shiftable clutch element, a cam surface formed on each of said flanges, axial projections formed on the cage of said one-way clutch, a cam surface formed on each of said projections and opposing the cam surfaces on said flanges, said two sets of cam surfaces, when brought into engagement by said shiftable clutch element subsequent to initial meshing engagement of the first-named clutch, reacting against one another to shift the cage and rollers into a position between the members of said one-way clutch so that engagement of said one-way clutch is rendered impossible and locking up of said clutches is prevented when torque other than that derived from said input member is applied to said output member in a reverse direction.

9. A control mechanism for a one-way clutch which clutch comprises an inner member, an outer member, a plurality of rollers adapted to wedge between said members to cause engagement of said one-way clutch, and a cage for said rollers and movable therewith; said control mechanism comprising, in combination, positive clutch means including a shiftable clutch element having teeth and complementary teeth connected to the inner member of said one-way clutch and engageable with said first-named teeth; and locking means comprising cam surfaces formed upon said shiftable clutch element of the positive clutch means and opposed cam surfaces formed on the cage of said one-way clutch, which two sets of cam surfaces, when brought into engagement subsequent to initial meshing engagement of the positive clutch means, position the cage and rollers so that engagement of said one-way clutch is rendered impossible.

10. A control mechanism for a one-way clutch which clutch comprises an inner member, an outer member, a plurality of rollers adapted to wedge between said members to cause engagement of said one-way clutch, and a cage for said rollers and movable therewith; said control mechanism comprising, in combination, positive clutch means including a shiftable clutch element having teeth and complementary teeth connected to the inner member of said one-way clutch and engageable with said first-named teeth; and locking means comprising radial flanges on the teeth of the shiftable clutch element, a cam surface formed on each of said flanges, axial projections formed on the cage, a cam surface formed on each of said projections and opposing the cam surfaces on said flanges, said two sets of cam surfaces, when brought into engagement subsequent to initial meshing engagement of the positive clutch means, reacting against one another to shift the cage and rollers into a position between the members of the one-way clutch so that engagement of said one-way clutch is rendered impossible.

11. A control mechanism for a one-way clutch which clutch comprises an inner member, an outer member, a plurality of rollers adapted to wedge between said members to cause engagement of said one-way clutch, and a cage for said rollers and movable therewith; said control mechanism comprising, in combination, positive clutch means including a shiftable clutch element having teeth and complementary teeth connected to the inner member of said one-way clutch and engageable with said first named teeth, said two sets of clutch teeth being bevelled in opposite directions on their adjacent surfaces to prevent engagement of said sets of teeth until their speeds are substantially synchronized; and locking means comprising cam surfaces formed upon said shiftable clutch element of the positive clutch means and opposed cam surfaces formed on the cage of said one-way clutch, which two sets of cam surfaces, when brought into engagement subsequent to initial meshing engagement of the positive clutch means, position the cage and rollers so that engagement of said one-way clutch is rendered impossible.

12. A control mechanism for a one-way clutch which clutch comprises an inner member, an outer member, a plurality of rollers adapted to wedge between the said members to cause engagement of said one-way clutch, and a cage for said rollers and movable therewith; said control mechanism comprising, in combination, positive clutch means including a shiftable clutch element having teeth and complementary teeth connected to the inner member of said one-way clutch and engageable with said first named teeth; and locking means comprising radial flanges on the teeth of the shiftable clutch element, a cam surface formed on each of said flanges, axial projections formed on the cage and having a shape adapted to fill the space between adjacent flanges when engagement of said flanges and said projections is fully effected, a cam surface formed on each of said projections and opposing the cam surfaces on said flanges, said two sets of cam surfaces, when brought into engagement subsequent to the initial meshing engagement of the positive clutch means, reacting against one another to shift the cage and rollers into a position between the members of the one-way clutch so that engagement of said one-way clutch is rendered impossible.

13. A control mechanism for a one-way clutch which clutch comprises an inner member, an outer member, a plurality of rollers adapted to wedge between the said members to cause engagement of said one-way clutch, and a cage for said rollers and movable therewith; said control mechanism comprising, in combination, positive clutch means including a shiftable clutch element having teeth and complementary teeth connected to the inner member of said one-way clutch and engageable with said first named teeth, said two sets of clutch teeth being beveled on their adjacent surfaces so that engagement of said sets of teeth is prevented until their speeds are substantially synchronized; and locking means comprising radial flanges on the teeth of the shiftable clutch element, a cam surface formed on each of said flanges, axial projections formed on the cage and having a shape adapted to fill the space between adjacent flanges when engagement of said flanges and said projections is fully effected, a cam surface formed on each of said projections and opposing the cam surfaces on said flanges, said two sets of cam surfaces, when brought into engagement subsequent to the initial meshing engagement of the positive clutch means, reacting against one another to shift the cage and rollers into a position between the members of the one-way clutch so that engagement of said one-way clutch is rendered impossible.

14. In combination, a one-way clutch comprising an inner member, an outer member, a plurality of rollers adapted to wedge between said members to cause engagement of said one-way clutch, and a cage for said rollers and movable therewith, said inner member being connectible to a shaft; positive clutch means including a shiftable clutch element having teeth and complementary teeth connected to the inner member of said one-way clutch and engageable with said first named teeth, said shiftable clutch element being connected with a second shaft; and means for rendering ineffective said one-way clutch and comprising cam surfaces formed upon the shiftable element of the positive clutch means and opposed cam surfaces formed on the cage of the one-way clutch, which two sets of cam surfaces, when brought into engagement subsequent to initial meshing engagement of the positive clutch means, position the cage and roller so that engagement of said one-way clutch is prevented.

15. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, and cooperating means on both clutches rendered effective, when said first-named clutch is engaged, for preventing an engagement of said one-way clutch whereby to prevent a jamming lock up of both of said clutches when torque other than that derived from said driving member is applied to said driven member in the reverse direction.

16. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, said one-way clutch comprising an inner member, an outer member, rollers adapted to wedge between said members to cause engagement of the one-way clutch and a cage for said rollers and movable therewith, and cooperating means on both clutches rendered effective upon engagement of said first-named clutch to shift the roller cage and rollers of said one-way clutch so that engagement of said one-way clutch is rendered impossible whereby to prevent a jamming lock up of both of said clutches when torque other than that derived from said driving member is applied to said driven member in the reverse direction.

17. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives and cooperating means associated with both clutches and actuable by said first-named clutch, during engaging movement thereof, to disengage said one-way clutch and hold the same disengaged when torque other than that derived from said driving member is applied to the driven member in the reverse direction and the mechanism is conditioned for the first-named speed ratio by engagement of said first-named clutch.

18. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, said one-way clutch comprising an inner member, an outer member, rollers adapted to wedge between said members to cause engagement of the one-way clutch and a cage for said rollers and movable therewith, and cooperating means associated with both clutches and actuable by said first-named clutch, during engaging movement thereof, to shift the roller cage and rollers of said one-way clutch so that engagement of said one-way clutch is rendered impossible whereby to prevent a jamming lock up of both of said clutches when torque other than that derived from said driving member is applied to the driven member in the reverse direction and the mechanism is conditioned for the first-named speed ratio by engagement of said first-named clutch.

19. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, and cam means rendered effective, when said first-named clutch is engaged, for preventing an engagement of said one-way clutch whereby to prevent a jamming lock up of both of said clutches when torque other than that derived from said driving member is applied to said driven member in the reverse direction.

20. In power transmission mechanism, the combination of a driving member, a driven member, means including a clutch for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, said one-way clutch comprising an inner member, an outer member, rollers adapted to wedge between said members to cause engagement of the one-way clutch and a cage for said rollers and movable therewith, and cam means rendered effective upon engagement of said first-named clutch to shift the roller cage and rollers of said one-way clutch so that engagement of said one-way clutch is rendered impossible whereby to prevent a jamming lock up of both of said clutches when torque other than that derived from said driving member is applied to said driven member in the reverse direction.

21. In power transmission mechanism, the combination of a driving member, a driven member, means including positive clutch means including toothed parts one of which is shiftable into engagement with the other for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, means for substantially synchronizing the speeds of said positive clutch parts prior to engagement thereof, and means rendered effective, when said first-named clutch is engaged, for preventing an engagement of said one-way clutch whereby to prevent a jamming lock up of both of said clutches when torque other than that derived from said driving member is applied to said driven member in the reverse direction.

22. In power transmission mechanism, the combination of a driving member, a driven member, means including positive clutch means including toothed parts one of which is shiftable into engagement with the other for completing a drive from said driving member to said driven member at a certain speed ratio, means including a one-way clutch for completing a drive from said driving member to said driven member at a slower speed ratio when said first-named clutch is disengaged, said driven member being driven in the same direction during the completion of either of said drives, means for substantially synchronizing the speeds of said positive clutch parts prior to engagement thereof, and means rendered effective, when said first-named clutch is engaged, for preventing an engagement of said one-way clutch whereby to prevent a jamming lock up of both of said clutches when torque other than that which is derived from said driving member is applied to said driven member in the reverse direction, said last-named means comprising interengageable elements carried by said first-named clutch and said one-way clutch respectively.

JOHN B. POLOMSKI.

REFERENCES CITED

The following references are of record in the file of this patent:

UNITED STATES PATENTS

| Number | Name | Date |
| --- | --- | --- |
| 2,140,502 | Banker | Dec. 20, 1938 |
| 2,237,297 | Banker | Apr. 8, 1941 |
| 2,328,291 | Osborne | Aug. 31, 1943 |
| 2,353,137 | Banker | July 11, 1944 |
| 2,355,709 | Dodge | Aug. 15, 1944 |
| 2,403,378 | Kilpela | July 2, 1946 |

FOREIGN PATENTS

| Number | Country | Date |
| --- | --- | --- |
| 605,879 | Germany | Nov. 20, 1934 |